July 12, 1960 T. ACOSTA 2,944,576
CITRUS FRUIT REAMER
Filed July 16, 1956
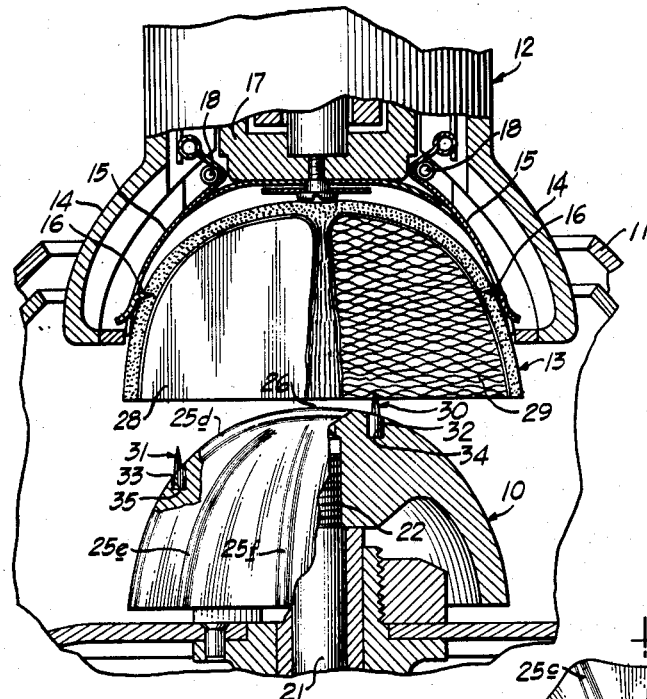
Inventor
Tracy Acosta
by McCanna and Morsbach
Attorneys United States Patent Office 2,944,576
Patented July 12, 1960

2,944,576

CITRUS FRUIT REAMER

Tracy Acosta, % H. J. Magruder,
New Smyrna Beach, Fla.

Filed July 16, 1956, Ser. No. 598,022

5 Claims. (Cl. 146—3)

This invention relates to a juice extracting apparatus and more particularly to an improved reamer for removing the juices and pulp from citrus fruits.

The reamer of the present invention is generally useful in apparatus for extracting juice from citrus fruits and is particularly adapted for use with automatic juice extracting apparatus wherein the fruit is automatically cut in half and the reamer then operated to remove the pulp and juice from the fruit. In such automatic machines, no provision is made for orienting the fruit fed to the cutter so that the fruit is cut in a direction crosswise of the membranes which separate the fruit sections and frequently the fruit is halved in such a manner that some of the membranes which separate the fruit sections are not severed. Under these conditions, complete reaming of the pulp and juice from the fruit halves is rendered difficult.

An important object of this invention is to provide an improved reamer construction for more efficiently removing the juice and pulp from citrus fruits.

Another object of this invention is to provide a reamer construction adapted to sever any unbroken membranes which enclose the pulp of the fruit sections to thereby facilitate removal of the pulp.

A further object of this invention is to provide a citrus fruit reamer arranged to cut the membranes which separate the fruit sections without separating the membranes from the rind whereby the reamer is operative to remove the pulp from the membrane and the latter remain on the rind for removal therewith.

Yet another object of this invention is to provide a citrus fruit reamer of simple construction and which is safe to use.

These, together with various ancillary objects and advantages of this invention will be more readily appreciated as the same becomes better understood by reference to the following detailed description when taken in connection with the accompanying drawings wherein:

Figure 1 is a fragmentary view of the reamer shown applied to an automatic juice extracting apparatus, and with parts broken away and shown in section to illustrate details of construction;

Fig. 2 is a top plan view of the reamer;

Fig. 3 is a sectional view through the reamer taken on the plane 3—3 of Fig. 2;

Fig. 4 is an enlarged fragmentary perspective view of the one of the membrane cutters;

Fig. 5 is a perspective view of a half section of fruit cut along a plane parallel to the core of the fruit; and Fig. 6 is a side elevational view of the reamer shown in operation removing the pulp from the fruit.

The reamer 10 of the present invention is generally useful in manual as well as automatic juice extracting apparatus and, for purposes of illustration, is shown applied to an automatic juice extracting apparatus of the type disclosed in the patent to Monroe 2,365,832. Such apparatus includes a reamer 10 disposed in a reamer housing 11 and a fruit gripping device 12. Generally, two fruit gripping devices are provided and arranged to grip a whole fruit which is fed thereto from a hopper. The fruit is halved while retained by the gripping devices and the gripping devices moved into the reamer housing to position the fruit half section adjacent the reamer, as shown in Fig. 1. The reamer is then operated to remove the juice and pulp from the fruit half sections 13 and the juice and pulp, after separation, are fed to separate receptacles.

The gripping device 12 is arranged to automatically grip the citrus fruit and release the same after the reaming operation and in general includes an outer cup-shaped member 14 having resilient fingers 15 mounted thereon. The latter are formed with points 16 arranged to impale the fruit. An ejector member 17 is mounted in the outer cup-shaped member for movement relative thereto. In the form shown, the ejector member has pins 18 engageable with the resilient fingers 15 operative to release the fingers when the ejector member is extended and to urge the fingers into clamping position when the ejector member is retracted into the outer cup-shaped member.

The reamer 10 is disposed within the reamer housing 11 and, as is conventional, has a generally dome-shaped configuration. The reamer is attached to a reamer drive shaft 21, as by the threaded connection 22 and is rotated thereby about its axis. The reamer is formed with a plurality of ribs 25, herein shown eight in number and designated 25a–25h, which ribs preferably extend substantially radially of the reamer from a point adjacent the crown of the reamer to the base or lower edge thereof, for removing the pulp from the fruit. Since it is advantageous to remove all the pulp 29 from the fruit without removing any of the membrane 28 or rag material from the rind, the radial ribs 25 are each rounded to provide a relatively smooth undulated surface on the reamer which effectively presses the pulp from the membranes without tearing or otherwise separating the membranes from the rind.

In the automatic juice extracting apparatus, no provision is made for so orienting the fruit with respect to the gripping elements that the latter will always be cut in a direction transversely of the membranes, as shown in Fig. 1, and frequently the fruit is halved in a direction which extends along the core of the fruit, as shown in Fig. 5, or at an oblique angle thereto. Under these conditions, some of the membranes 28 which separate the sections of the fruit are not severed. When the radial ribs on the reamer are rounded as previously described, a relatively high pressure is required to force the reamer into the fruit half sections.

When the reamer must exert a relatively high pressure during the reaming operation to force the reamer into the fruit, there is a marked tendency to break the oil cells in the fruit skin and release these undesirable oils. These oils from the rind, when mixed with the fresh fruit juice, adversely affect the flavor of the juice. This invention is arranged to decrease the pressure required to force the reamer into the fruit and thereby prevent extraction of the oils from the skin.

In order to reduce the pressure required to move the reamer into the fruit half sections, the reamer is advantageously provided with a transverse rib 26 on the crown 34 thereof, which rib projects above the crown of the reamer. The transverse rib 26, as best shown in Fig. 2, extends obliquely to a pair of diametrically opposed ribs designated 25d and 25h and these ribs are skewed somewhat at their upper ends to merge smoothly with opposed ends of the transverse rib 26. Each of the ribs 25a–25c and 25e–25f fair smoothly into the crown of the reamer while the ribs 25d and 25h project above the crown and fair smoothly with the ends of the transverse rib 26. This provides a continuous protuberance on the reamer which projects above the crown of the reamer and spirals slightly downwardly along opposite sides of the reamer.

In accordance with the present invention one or more cutters are mounted on the reamer and arranged for rotation therewith to cut the fibrous membranes which separate the fruit sections and thereby facilitate removal of the juice and pulp therefrom. In the embodiment illustrated, a pair of cutters designated 30 and 31 are provided, which cutters may be mounted on the reamer in any desired manner. As best shown in Figs. 1 and 4, the cutters respectively include an annular base 32 and 33 which is pressed into complementary sockets 34 and 35 formed in the reamer head. The cutter blades are mounted on the outer side of the reamer head eccentrically of the reamer axis, that is, at a point on the outer surface of the reamer head intermediate the crown and base thereof to move with the head in a circular path, as shown in dotted lines at 36 and 37 in Fig. 5. The blade 30 is preferably located relatively closer to the crown than to the base and is preferably spaced from the crown a distance sufficient to prevent engagement of the blade with the seeds in the fruit. The blade extends in a generally axial direction outwardly of the periphery of the reamer head and is dimensioned to extend outwardly of the reamer head sufficiently to project about one-eighth inch above a plane through the apex of the transverse rib 26 on the top of the reamer head and normal to the axis of the reamer so as to thereby sever the membranes in the fruit in advance of the engagement of the membranes with the reamer head. Advantageously, the blade 30 is mounted as shown in Fig. 1 to extend outwardly from one of the ribs such as 25h which project above the crown of the reamer to reduce the exposed area of the blade. The blades are each formed with a circumferentially elongated across section to provide the requisite rigidity and the leading edges of the blades are sharpened to readily cut the membranes as the reamer rotates. The other blade 31 is spaced radially outwardly on the reamer head from the blade 30 and is arranged to sever the membranes adjacent the outer portion of the fruit half section. The blade 31 also extends axially of the reamer head and preferably extends outwardly from one of the ribs such as 25d approximately one-eighth inch or less to avoid cutting through the rind of the fruit.

As is apparent, the cutter blades 30 and 31 operate to sever the membranes which separate the sections of the fruit to thereby open each of the sections and facilitate removing of the pulp therefrom. The blades, however, do not tear or otherwise separate the membranes from the rind so that the latter remain in the rind. The protuberance formed by the raised ribs 25d and 25h and the transverse rib 26 projects above the reamer and reduces the pressure required to force the reamer into the fruit.

I claim:

1. A reamer for citrus fruits comprising a solid domed head having a plurality of ribs formed on the periphery thereof and extending from a point adjacent the crown of the head to the lower edge thereof, said ribs being rounded at the apex thereof to provide a smoothly undulating surface on the head for pressing the juice from the fruit, and a cutter blade on said head eccentric of the axis of rotation thereof and extending outwardly therefrom in a direction substantially parallel to the axis of the head to cut the membranes which separate the sections of the fruit, said cutter blade having an oblong cross-section and having the major transverse axis thereof extending substantially tangentially of the circle described by said head at the point of attachment of the cutter blade thereto.

2. A reamer for citrus fruits comprising a solid domed head having a plurality of ribs formed on the periphery thereof and extending from a point adjacent the crown of the head to the lower edge thereof, said ribs being rounded at the apex thereof to provide a smoothly undulating surface on the head for pressing the juice from the fruit, and a cutter blade on said head eccentric of the axis of rotation thereof and located relatively closer to the crown than to the base of said head, said cutter blade extending outwardly of the head in a direction substantially parallel to the axis of the head to cut the membranes which separate the sections of the fruit, said cutter blade having an oblong cross-section and having the major transverse axis thereof disposed substantially tangentially of the circle described by said head at the point of attachment of the cutter blade thereto.

3. A reamer for citrus fruits comprising a solid domed head having a plurality of ribs formed on the periphery thereof and extending from a point adjacent the crown of the head to the lower edge thereof, said ribs being rounded at the apex thereof to provide a smoothly undulating surface on the head for pressing the juice from the fruit, and a cutter blade on said head eccentric of the axis of rotation thereof and located relatively closer to the crown than to the base of said head, said cutter blade extending outwardly of the head in a direction substantially parallel to the axis of the head to cut the membranes which separate the sections of the fruit, said cutter blade projecting above a plane through the crown of the head and normal to the axis thereof, said cutter blade having an oblong cross-section and having the major transverse axis thereof disposed substantially tangentially of the circle described by the head at the point of attachment of the cutter blade thereto.

4. A reamer for citrus fruits comprising a solid domed head having a plurality of ribs formed on the periphery thereof and extending from a point adjacent the crown of the head to the lower edge thereof, said ribs being rounded at the apex thereof to provide a smoothly undulating surface on the head for pressing the juice from the fruit, and a cutter blade on said head eccentric of the axis of rotation thereof and located relatively closer to the crown than to the base of said head, said cutter blade extending outwardly of the head in a direction substantially parallel to the axis of the head to cut the membranes which separate the sections of the fruit, said cutter blade projecting above a plane through the crown of the head and normal to the axis thereof, a second cutter blade on said head between said first mentioned cutter blade and the lower edge of said reamer and projecting upwardly therefrom in a direction substantially parallel to the axis of the reamer head to sever the membranes adjacent the outer periphery of the fruit half-sections, said second cutter blade being located at a point circumferentially spaced around the reamer head from said first mentioned blade, said cutter blades having an oblong cross-section and having the major transverse axes thereof disposed substantially tangentially to the circles described by the head at the respective points of attachment of the blades thereto.

5. A reamer for citrus fruits comprising a solid domed head having a plurality of substantially radially extending ribs formed on the periphery thereof and extending from a point adjacent the crown of the head to the lower edge thereof, said ribs being rounded at the apex to provide a smoothly undulating surface on the head for pressing the juice from the fruit, and a cutter blade mounted on one of said ribs eccentric of the axis of the head and relatively closer to the crown than to the lower edge of the head, said blade extending in a direction substantially parallel to the axis of the head to sever the membranes of the fruit and having an oblong cross-section the major transverse axis of which extends substantially tangentially of the circle described by the head at the point of attachment of the cutter blade thereto.

References Cited in the file of this patent

UNITED STATES PATENTS

| 428,947 | Prince | May 27, 1890 |
| 618,122 | Nelson | Jan. 24, 1899 |
| 1,977,011 | Orfanson | Oct. 16, 1934 |
| 2,034,301 | Knapp | Mar. 17, 1936 |
| 2,365,832 | Monroe | Dec. 26, 1944 |